… …

United States Patent [19]

Nagoshi et al.

[11] Patent Number: 5,205,694
[45] Date of Patent: Apr. 27, 1993

[54] SELF-TAPPING SCREW

[75] Inventors: Eiichi Nagoshi, Chigasaki; Osami Iwasaki; Tetuya Akashi, both of Hatano, all of Japan

[73] Assignee: Topura Co., Ltd., Osaka, Japan

[21] Appl. No.: 875,292

[22] Filed: Apr. 29, 1992

[30] Foreign Application Priority Data

May 29, 1991 [JP] Japan ................... 3-152282

[51] Int. Cl.⁵ ............... F16B 23/00; F16B 35/06
[52] U.S. Cl. .................... 411/399; 411/404; 411/919
[58] Field of Search ............ 411/402, 403, 404, 410, 411/386, 387, 399, 919

[56] References Cited

U.S. PATENT DOCUMENTS

| | | | |
|---|---|---|---|
| 366,158 | 7/1887 | Dow | 411/399 |
| 1,151,861 | 8/1915 | Brumback | 411/399 |
| 4,355,552 | 10/1982 | Gutshall | 411/404 |
| 4,655,661 | 4/1987 | Brandt | 411/399 X |

FOREIGN PATENT DOCUMENTS

| | | | |
|---|---|---|---|
| 268961 | 6/1988 | European Pat. Off. | 411/399 |
| 158599 | 2/1905 | Fed. Rep. of Germany | 411/403 |

Primary Examiner—Neill R. Wilson
Attorney, Agent, or Firm—Kanesaka and Takeuchi

[57] ABSTRACT

By modifying a shape of a head part of a screw, an inserting performance when a punching operation is carried out, a fastening performance when the screw is seated, and a finishing process upon completion of fastening against a member to be fastened are improved. A seat surface of the head part is formed in an inverse truncated conical shape with its outer circumference being a curved concave surface and the upper surface of the head part is formed with a spherical concave surface. The head part is provided with a plurality of spot facing projections extending from the seat surface of the small diameter part at the lower portion of the head part adjacent to the screw shaft part along the curved concave surface of the seat surface in a longitudinal direction. The upper surface of the head part formed in the spherical concave surface is provided with chamfered portions in which an opening edge of the engaging groove of a cross-shaped hole is cut in a conical shape.

4 Claims, 3 Drawing Sheets

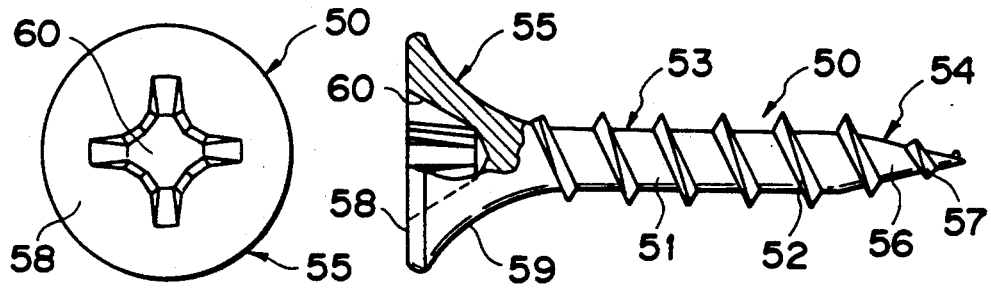
FIG. 7(a)  FIG. 7(b) PRIOR ART
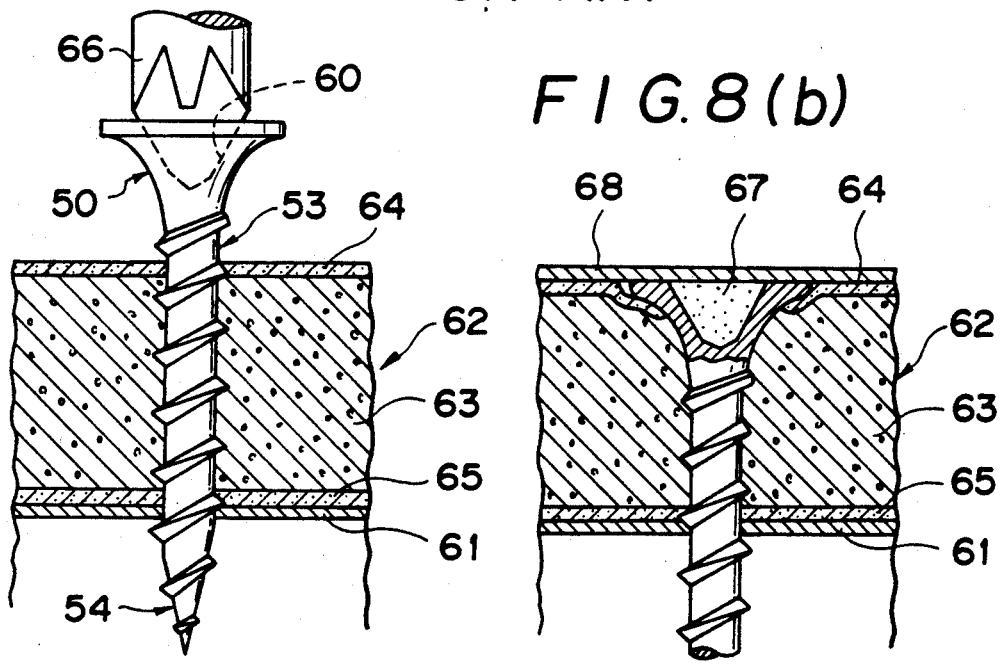
FIG. 8(a) PRIOR ART
FIG. 8(b)
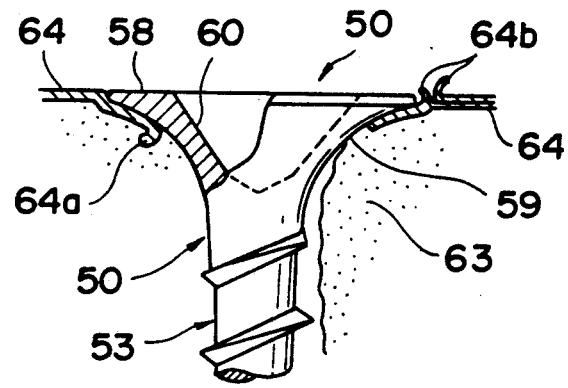
FIG. 9 PRIOR ART

SELF-TAPPING SCREW

BACKGROUND OF THE INVENTION

1. Field of the Invention

This invention relates to an improvement of a screw or self-tapping screw which is suitable for fastening a panel member as a building wall or a ceiling or the like, for example, to a ground material at a main structure side.

2. Description of the Prior Art

This type of screw or self-tapping screw in the prior art is defined in general as a dry wall screw or the like and constructed as shown in FIG. 7, for example. This screw 50 is used for fastening a panel member such as a gypsum board 62 applied under tension over a surface of a steel ground material 61 of a light weight type steel or the like constituting an edge of a structure at a main structure side such as a building wall or a ceiling as shown in FIG. 8, for example.

As this ground material, in addition to the aforesaid steel ground material 61, there are wooden structural materials such as wood or particle board and further as a panel member, there are a plywood, a hard board, a flexible board or the like in addition to the aforesaid gypsum board 62.

However, the screw of the present invention can be used for fastening various types of panel members to various types of ground materials and in particular the most preferable effect can be attained if the present invention is applied to a steel ground material having a thin wall, a hard panel and a fragile gypsum board.

The screw of the prior art type described above is comprised of a screw shaft part 53 having a thread 52 at an outer circumference of a shaft part 51 of a straight column-like shape, a drilling part 54 connected to an extreme end of the screw shaft part 53 and a head part 55 arranged at a rear end part of the screw shaft part 53.

The drilling part 54 is formed with a tapered shaft part 56 formed to have a gradually decreased diameter from the shaft part 51 toward its extreme end, and an extreme end thread 57 connected to the thread 52 at an outer circumference of the tapered shaft part 56, wherein the fastening is carried out while the drilling part 54 cooperates with the screw shaft part 53 to perform a punching and a threading.

The aforesaid head part 55 has a circular shape at a flat upper surface 58 of which outer circumferential edge is concentrically projected widely in a radial direction from the aforesaid shaft part 51, and the head part 55 is provided with an engaging groove 60 such as a cross-shaped hole where a screw driver tool is engaged with a central part of the upper surface 58. A seat surface 59 of the head part 55 extending from the outer circumferential edge of the upper surface 58 to the aforesaid shaft part 51 is formed with an inverse truncated cone having a curved concave surface in which its outer circumference is gently slopped decreased in its diameter, converged into a shaft diameter of the shaft 51 and gradually along an axial direction so as to hold the gypsum board 62 with a strong holding force upon completion of the fastening action, i.e., an entire shape of the head 55 is formed in a trumpet-shape.

The screw to which the present invention pertains is not limited to a tapping screw structure as described above, but it can be applied to a screw of a self-drilling structure in which a drilling part having a drill end acting as a self-punching action similar to that of the general type of a drill blade is formed at an extreme end of the aforesaid screw shaft part, the drilling part performs a punching action and the threads 52 of the screw shaft part 53 are subsequently applied for making a screw setting, for example, a self-tapping screw disclosed in the gazette of Jap.U.M.Publn.No.Hei 2-29294.

As described above, in case that the panel member is the gypsum board 62, an additive agent is added to the gypsum of the base material. Since solidified into a plate form and the gypsum board is fragile, the protection sheets 64 and 65 having superior adhering characteristic and coating characteristic such as a cardboard or a fiber or the like are applied to both surfaces of the gypsum plate 63 with an adhesive agent.

When the gypsum board 62 is to be fixed, as shown in FIG. 8 (a), an extreme end of the screw driver tool 66 is engaged in the engagement groove 60 of the screw 50, the screw driver tool 66 is rotated and the drilling part 54 of the screw 50 is pierced into the gypsum board 62. With such an arrangement, the drilling part 54 reaches the steel ground material 61 while punching in sequence against the gypsum board 62, the punching and threading are carried out in the steel ground material 61, subsequently the screw shaft part 53 is threadably fitted to the steel ground material 61, and the upper surface 58 of the head part 55 is flush with the surface of the gypsum board 62, or preferably the fastening is completed while the upper surface is being slightly recessed. After this state, the upper surface 58 of the head part 55 containing the engaging groove 60 and the recessed surface of the gypsum board 62 generated at an outer circumferential edge are filled with a putty coating 67 so as to make a uniform surface for applying a cloth or a paint over an entire surface area of the gypsum board 62 is made so as to perform a finishing process with an ornamental material 68.

However, in case of the screw 50 having the structure of the prior art as described above, the screw has the following several problems to be resolved.

At first, in case of the aforesaid screw 50, the upper surface 58 of the head part 55 is formed flat, and an engaging groove 60 with which the screw driver tool 66 is engaged to recessed at the upper surface 58, so that an installing fitness for the screw driver tool 66 is insufficient.

In recent years, a screw driver tool 66 has been frequently used under a condition that the screws 50 intermittently supplied in sequence are rotationally driven by an electrical screw driver of high speed rotation so that the screw fastening operations can be efficiently carried out at several locations. Accordingly, if the extreme end of the screw driver tool 66 is not accurately fitted to the engaging groove 60, the engaging groove 60 is damaged or dropped out and a screwing with a desired rotational torque can not be carried out. Due to this fact, the screw is fastened while the upper surface 58 of the head part 55 is floated up from the surface of the gypsum board 62, a sufficient supporting force may not be attained for the gypsum board 62 and a finishing process with the ornamental material 68 is troubled as described below.

In case of the aforesaid screw 50, the drilling part 54 at the extreme end thereof is formed with a sharp shape in order to improve a performance of screwing action during a punching operation, a carbon sintering treatment is carried out for the screw and at the same time its outer circumference is formed as a seat surface 59 of an inverse truncated cone, i.e., a trumpet shape of curved concave surface so that the gypsum board 62 can be pressed with a strong holding force upon completion of the fastening work.

However, since the seat surface 59 has no cutting capability and an entire circumferential surface of the seat surface 59 is concurrently contacted with the gypsum 63 during the screwing action so as to act as a substantial resistance, it requires a substantial thrusting force (a pushing force). Consequently, there is a possibility that an application of excessive thrust force causes the thread formed in the steel ground material 61 to be destroyed or the screw is fastened while the upper surface 58 of the head 55 is being floated away from the surface of the gypsum board 62.

In particular, in the event that a thickness of the steel ground material 61 is thin and the gypsum board 62 has a high hardness, even if a cutting force of the drilling part 54 is improved as described above and a screwing torque for use in punching the steel ground material 61 is reduced, it becomes necessary to provide a larger thrusting force than the screwing torque for pushing the head part 55 as described above, resulting in that the thread screwed at the steel ground material 61 is damaged and the screw 50 runs idle. As a result, the screw is fastened with the upper surface 58 of the head part 55 floated up away from the surface of the gypsum board 62, a sufficient supporting force can not be attained for the gypsum board 62, and at the same time a certain trouble may occur in a finishing process with an ornamental material 68 as described below.

It is preferable that a height of the upper surface 58 of the head part 55 upon completion of the fastening operation is in such a degree to be slightly concaved from the surface of the gypsum board 62 so as to enable the concave surface to be repaired with a putty coating 67. However, the upper surface 58 of the head part 55 is projected from the surface of the gypsum board 62 due to the aforesaid reasons or the height of the upper surface 58 of the head 55 in respect to the surface of the gypsum board 62 is not made constant due to characteristics of the steel ground material 61 and the gypsum board 62 as well as irregularity in of the fastening force. Due to this fact, the upper surface 58 of the head part 55 is projected, resulting in that the projected surface can not be repaired with the putty coating 67 and even in the case of the flush surface, the metallic surface has a poor putty applicability thereon. Further, the upper surface 58 of the head part 55 may not be applied with the putty coating 67 in sufficient thickness and so the putty coating 67 may easily be peeled off when dried, and even if a finishing process with an ornamental material 68 is carried out, some irregular corrugated portions are generated and a uniform and superior finished surface can not be attained.

The protection sheet 64 broken by a screwing action of the screw 50 is brought into the gypsum 63 by a pushing action of the head part 55, the protection sheet 64 is peeled off as it is and as shown in FIG. 9, the peeled-off partial broken piece 64a can not be pressed with the seat surface 59 but wound around the seat surface 59 in an irregular state, resulting in that upon completion of the fastening operation of the screw, a seating state of the seat surface 59 is made inferior and the seating is made unstable while the head part 55 is inclined or floated and then its supporting force against the gypsum board 62 is reduced.

In addition, the partially bulged-out and finely peeled piece 64b protrudes outwardly from an outer circumferential edge of the head part 55 upon completion of fastening operation. If the finishing process with the putty coating 67 or the ornamental material 68 is carried out while the peeled piece 64b is being kept as it is, some corrugated portions are generated and a uniform and superior finished surface may not be attained, so that a quite troublesome manual operation is required for cutting the corrugated portions or grinding off with a sandpaper.

In view of the foregoing, it is an object of the present invention to provide a screw or self-tapping screw capable of improving these problems.

It is also an object of the present invention to provide a screw or self-tapping screw to which fitting of a screw driver tool can be accurately and easily carried out.

It is a still further object of the present invention to provide a screw or self-tapping screw in which resistance during a threading operation of the, screw is reduced and performance of threading operation is improved.

It is a still further object of the present invention to provide a screw or self-tapping screw in which an idle rotation of a screw caused by an excessive thrust force is prevented and a supporting force of the screw is improved.

It is an object of the present invention to provide a screw or self-tapping screw in which a head part is buried in a target surface upon completion of a fastening operation and the screw is suitable for a finishing work such as a putty coating or the like.

It is also an object of the present invention to provide a screw or self-tapping screw in which a breakage of a covering protection sheet on the target surface is prevented to improve a supporting force of the screw.

It is also an object of the present invention to provide a screw or self-tapping screw which is suitable for preventing a turning-up of a covering protection sheet on the target surface as well as its fine split and for improving a surface finishing work.

Other objects and advantages of the present invention will become apparent from the description of the preferred embodiments in reference to the accompanying drawings.

SUMMARY OF THE INVENTION

A subject matter of the present invention consists in a screw or self-tapping screw in which an extreme end of a screw shaft part is provided with a drilling part of a sharp end or a drill part, a head part arranged at a rear end part of the screw shaft part is formed with an inversely truncated conical shape with its outer circumference being a curved concave surface, an upper surface of the head part is formed with an engaging groove such as a cross-shaped hole to which a screw driver tool is fitted and an upper surface of the head part including an edge of the opening of the engaging groove is formed with a spherical concave surface.

Another subject matter of the present invention consists in a screw or self-tapping screw in which an upper surface of a head part formed into the aforesaid spherical concave surface is provided with a chamferred part machined to have an inwardly tapered part by cutting an edge of an opening of the engaging groove into a cone shape.

A still further subject matter of the present invention consists in a screw or self-tapping screw in which a plurality of spot facing projections are arranged at a seat surface of the head part in an equally-spaced apart relation at an outer circumference of a small diameter part positioned adjacent to the screw shaft part and along the curved concave surface of the seat surface.

BRIEF DESCRIPTION OF THE DRAWINGS

FIG. 1 shows a screw or self-tapping screw of one preferred embodiment of the present invention, wherein

FIG. 7 shows a screw or self-tapping screw of the prior art, wherein FIG. 7(a) is a top plan view seen from the head part and FIG. 7(b) is an entire front elevational view with a part being broken away.

FIG. 8 shows the screw of FIG. 7, wherein FIG. 8(a) and FIG. 8(b) are front elevational views in use.

FIG. 9 shows a state of use of the screw shown in FIG. 7.

DESCRIPTION OF THE PREFERRED EMBODIMENTS

Figure 1A:
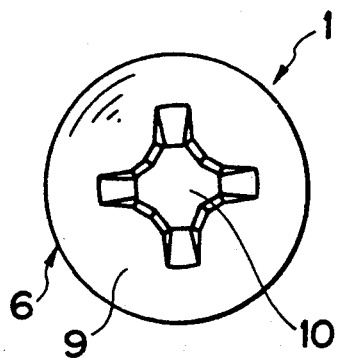
FIG. 1(a) shows a top plan view seen from the head part of the screw and FIG. 1(b) is an entire front elevational view, respectively.

Referring now to the drawings, some preferred embodiments of the present invention will be described in detail.

Figure 1B:
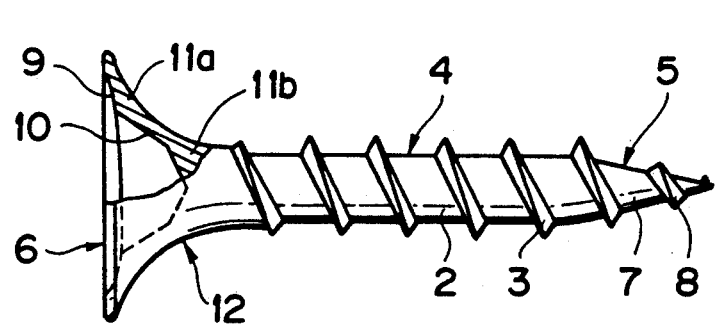

The screw or self-tapping screw 1 is comprised of a screw shaft part 4 formed by projecting threads 3 at an outer circumference of a shaft part 2 having a straight column-like shape as shown in FIG. 1, a drill part 5 connected to an extreme end of the screw shaft part 4 and formed with an extreme end thread part 8 continuous with the thread 3 at an outer circumference of a tapered shaft 7 at an extreme end of which diameter is gradually decreased from the shaft part 4, and a head part 6 arranged at a rear end of the screw shaft part 4. The screw shaft part 4 and the drill part 5 have the same configuration as that of the screw 50 of the prior art described above.

The head part 6 is provided with an upper surface 9 which is a circle having an outer circumferential edge projected substantially in a radial direction in a concentric manner from the shaft part 2 and formed with a spherical concave surface having its central part mostly concaved, and then a central part of the upper surface 9 is provided with an engaging groove 10 such as a cross-shaped hole to which a screw driver tool is engaged.

In addition, a seat surface 12 formed with an outer circumference of the head part 6 extending from the upper surface 9 to the shaft part 2 is formed in a so-called trumpet-shape. That is, the seat surface 12 has an outer circumference extending from a large diameter portion 11a at an upper side of the head part 6 equal to an outer circumferential edge of the upper surface 9 to a small diameter portion 11b at the lower part having the same diameter as that of the screw shaft part 4 which is formed in an inverse truncated conical shape having a curved concave surface of which diameter is gradually decreased in an axial direction.

Figure 2:
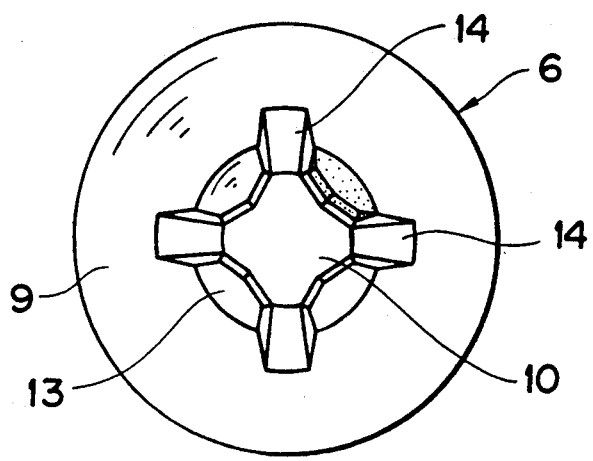
FIG. 2 is a top plan view for showing the head part of another preferred embodiment of the screw of FIG. 1.

In addition, the head part 6 may also have some chamferred portions 13 as shown in FIG. 2 at the upper surface 9 including the engaging groove 10. The chamferred portions 13 are made such that an opening edge between the adjacent wings 14 is cut in a conical shape in respect to a concentric circle traversing at a substantial intermediate part in a radial direction of each of the wings 14 forming the engaging groove 10 so as to form an inward-directed tapered surface.

Figure 3:
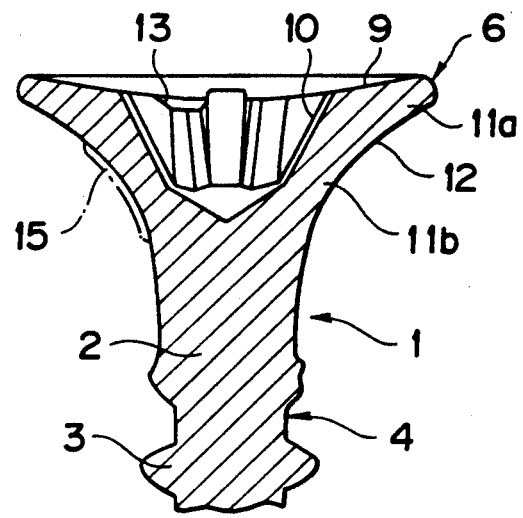
FIG. 3 is an enlarged longitudinal section for showing the head part of the screw shown in FIGS. 1 and 2.

In addition, FIG. 3 shows a sectional shape of the head part in FIG. 1(a) having no chamferred portion 13 at a right half portion, and the left half portion shows a sectional shape of the head part shown in FIG. 2 having the chamferred portion 13.

Figure 4:
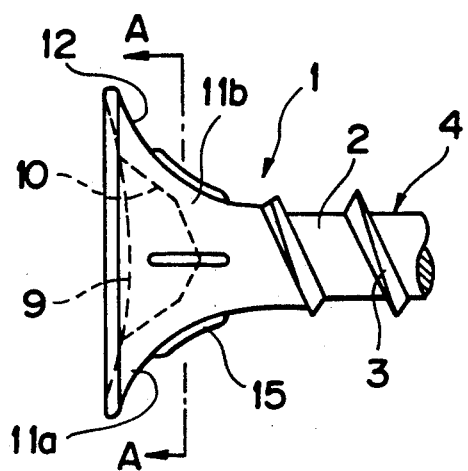
FIG. 4 is a front elevational view for showing a substantial part of a screw or self-tapping screw of another preferred embodiment.

Then, FIG. 4 shows a preferred embodiment of another screw or self-tapping screw in which a shape of the head part 6 is further modified, wherein a plurality of spot facing projections 15 are projected from a part of the seat surface 12 of the head part 6 in the screw 1 and other configurations are quite the same as those of the screw 1.

Figure 5:
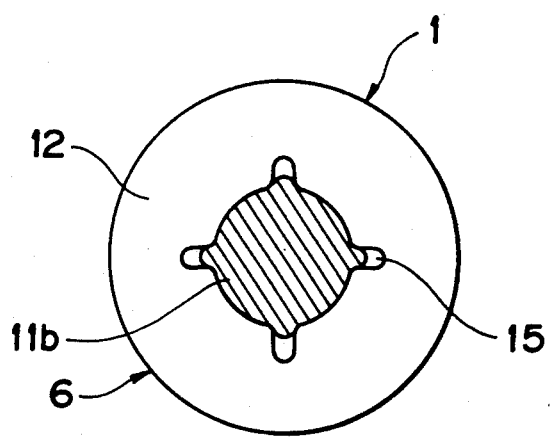
FIG. 5 is a sectional view taken along a line A—A of FIG. 4.

The spot facing projections 15 are arranged in an equal spaced-apart relation along a circumferential direction at an outer circumference of a small diameter part 11b of the lower portion adjacent to the screw shaft part 4 and further longitudinally extended while being projected along the curved concave surface of the seat surface 12 at a specified height and width, as shown in FIG. 5, for example.

When the gypsum board 62 of the panel member is fastened in the same manner as that of the prior art shown in FIG. 8 with the drilling screw 1 having the aforesaid configuration, the screw may act as follows.

As the extreme end of the rotating screw driver tool 66 abuts against the upper surface 9 of the head part 6 of the screw 1, it is guided into the engaging groove 10 at the central part along the spherical concave surface and even though its axial point is slightly displaced, the tool can be positively installed.

In addition, as shown in FIG. 2, if the opening edge of the engaging groove 10 is provided with some chamferred portions 13, the extreme end of the screw driver tool 66 is transferred smoothly from the spherical concave surface into the engaging groove 10 and further an installation of the screw in the screw driver tool 66 can be improved.

Accordingly, a rotational torque of the screw driver tool 66 is transmitted positively to the screw 1 to get a desired thrust force and at the same time it is possible to prevent the extreme end of the screw driver tool 66 from damaging the engaging groove 10 of the cross-shaped hole.

The screw 1 rotated by the screw driver tool 66 is operated such that the drill part 5 at the extreme end breaks through the protection sheet 64 and pierces into the gypsum board 62, where the gypsum plate 63 is punched in sequence, the drill part passes through the protection sheet 65, reaches a steel ground material 61, performs punching and threading in the steel ground material 61 and then the screw shaft part 4 is threadably fitted into the steel ground material 61.

Figures 6A, 6B:
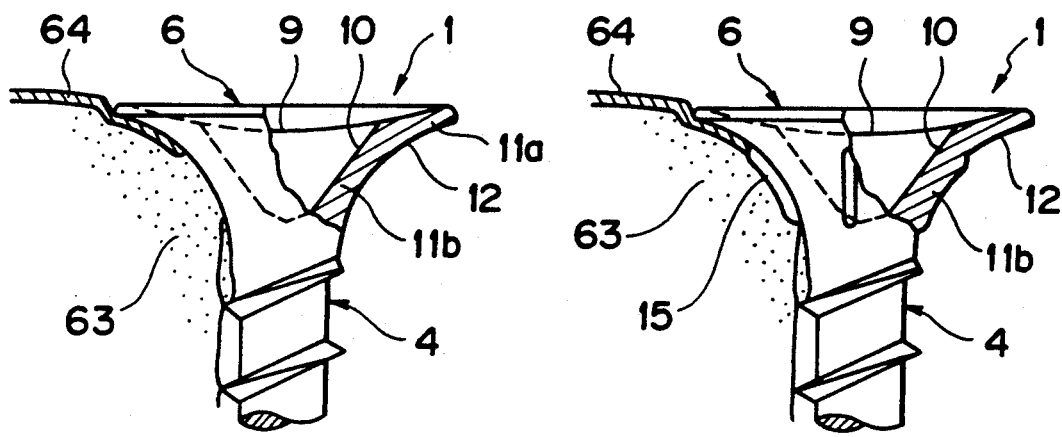
FIG. 6(a) shows a state of use of the screw shown in FIG. 1.
FIG. 6(b) shows a state of use of the screw shown in FIG. 4.

In addition, the seat surface 12 of the head part 6 is pushed into the gypsum board 62 punched by the screw shaft part 4, seated and inserted while the upper surface 9 of the head part 6 is being slightly concaved from the surface of the gypsum board 62 as shown in FIG. 6(a).

In this case, as described above, if the spot facing projections 15 are formed at the small diameter portion 11b of the head part 6 forming the seat surface 12, the spot facing projections 15 cause the pushing action to be interrupted for a moment while starting a cutting operation at the time of inserting operation, thereafter the seat surface 12 cuts the gypsum 63 by the spot facing projections 15 while a frictional resistance of a small contact area with the gypsum board being reduced, the small diameter portion 11b of the head part 6 is pushed with a weak thrusting force and at a slow speed and lastly a large diameter portion 11a of the head part 6 having no spot facing projections 15 is pushed into the board. With such an arrangement, the head part 6 is pushed into the board while the thrusting force is dispersed at an upper side and a lower side along an interface between presence and absence of the spot facing projections 15.

As described above, a thrust force for pushing the head part 6 into the board is reduced, an unbalanced state created by a screwing torque against the steel ground material 61 by the drill part 5 is decreased and the head part 6 is prevented from being pushed into the board at once at a fast speed, whereby even in the case that a plate thickness of the steel ground material 61 is thin and the gypsum board 62 has a high hardness, the thread formed in the steel ground material 61 can be prevented from being damaged, the screw can be prevented from being rotated idle or the screw can be prevented from being fastened while the upper surface 9 of the head part 6 is being floated up away from the surface of the gypsum board 62, resulting in that a sufficient supporting force can be attained with respect to the gypsum board 62.

The gypsum board 62 cut by the spot facing projections 15 that described above is stored in such a way as the gypsum 63 or cut flocks of the protection sheet 64 or the like may be stored between the adjacent spot facing projections 15 not bulging out therefrom as shown in FIG. 6(b) and at the same time the protection sheet 64 is uniformly expanded outwardly along the seat face 12 of the large diameter part 11a of the head 6.

Accordingly, a stability of the head 6 at its seated state is improved and a supporting force of the head part against the gypsum board 62 is improved upon completion of the fastening operation. At the same time a troublesome operation in the prior art such as cutting of a part of the protection sheet 64 bulged outwardly or grinding it off with a sandpaper can be eliminated, and the putty coating 67 or a finishing treatment with the ornamental material 68 can be carried out for making a uniform and superior finished surface.

As described above, when fastening with the screw 1 is completed, it is preferable that the upper surface 9 of the head part 6 is slightly concaved in respect to the surface of the gypsum board 62 in view of the foregoing reasons. However, even the event that the head surface is in flush with the board due to various causes, the screw 1 having the upper surface 9 of the head part formed into a spherical concave surface enables the subsequent finishing process to be carried out well.

That is, even if the upper surface 9 of the head part 6 is flush with the board, the outer circumferential edge is set at a limited fine annular part and an inner circumferential state is in a concaved surface from the surface of the gypsum board 62, so that a sufficient thickness of the putty not to peel off the upper surface 9 of the head part 6 is assured and then a disturbance caused by the projected head part 6 can be corrected.

As apparent from the aforesaid preferred embodiments, the following effects can be expected with the screw of the present invention.

The upper surface of the head part is formed into the spherical concave surface to enable the screw driver tool to be guided into the engaging groove and positively fitted in it, so that the rotational torque of the screw driver tool is positively transmitted to the screw to get a desired thrusting force and at the same time the extreme end of the screw driver tool can be prevented from being damaged.

The opening edge of the fitting groove formed at the upper surface of the head part with the spherical concave surface is provided with chamfered parts for guiding the screw driver tool into the fitting groove, so that an installing characteristic of the screw driver tool can be improved.

Since the upper surface of the head part with the aforesaid spherical concave surface is made such that the upper surface of the head part is concaved from the surface of the gypsum board upon completion of the fastening operation, it is possible to correct the projection of the head part caused by a disturbed fastening state and at the same time a sufficient thickness of the putty coating can be assured so as not to peel off the upper surface of the head part and then the subsequent finishing work can be made superior.

Since the aforesaid spot facing projections are formed at the small diameter portion of the seat surface adjacent to the screw shaft part to cause the head part to be gradually pushed into the board with a small thrusting force, an unbalanced state with the screwing torque in respect to the steel ground material with the drilling part is reduced and in particular even in the case that a plate thickness of the steel ground material is thin and the gypsum board has a high hardness, the thread part screwed at the steel ground material can be prevented from being damaged or the screw can be prevented from being fastened while the upper surface of the head part is being floated away from the surface of the gypsum board and further a sufficient supporting force can be attained for the gypsum board.

In addition, at the seat surface of a small diameter portion at the lower part of the head part where the spot facing projections are provided, the cut flocks of gypsum or protection sheet are stored between the adjoining spot facing projections and at the seat surface of the large diameter part at the upper part of the head part where the spot facing projections are not present, the protection sheet is expanded outwardly in a uniform manner, so that a seated state of the head part upon completion of the fastening can be stabilized, the supporting force of the screw against the gypsum board can be improved, at the same time a troublesome operation for removing the protection sheet bulged out in the prior art can be eliminated, and then the finishing process with the putty coating or the ornamental material is carried out while the protection sheet is kept as it is to obtain a uniform and superior finished surface.

The foregoing description is applied only for illustrating the present invention, various modifications or alternations of the present invention can be attained and the present invention is restricted only with the following claim.

What is claimed is:

1. A screw comprising a screw shaft part, a sharp end integrally formed with the screw shaft part, and a head part integrally formed with the screw shaft part at a side opposite to the sharp end, said head part including a seat part extending to the screw shaft and having a shape of an inverse truncated cone with a curved outer surface, a spherical concave surface at an upper end surface of the head part, and an engaging groove adapted to engage with a screw driver tool, said engaging groove extending inwardly from the spherical concave surface and having chamfered portions with inwardly tapered shapes at an entire edge of the engaging groove so that the screw driver tool can be easily engaged with the engaging groove.

2. A screw according to claim 1, wherein said seat part includes a plurality of elongated projections extending in the longitudinal direction of the screw shaft and equally spaced apart from each other on the curved outer surface of the seat part.

3. A screw according to claim 1, wherein said engaging groove includes a center portion and a plurality of wings extending radially outwardly from the center portion, said chamfered portions being formed at portions between the wings in addition to the entire edge of the groove.

4. A screw according to claim 1, wherein said screw is a self-tapping screw.

* * * * *